United States Patent [19]

Koeller

[11] 4,203,703

[45] May 20, 1980

[54] HYDRAULIC TURBO MACHINE WICKET GATE SEALS

[75] Inventor: Paul Koeller, Dorval, Canada

[73] Assignee: Dominion Engineering Works Limited, Lachine, Canada

[21] Appl. No.: 845,546

[22] Filed: Oct. 26, 1977

[30] Foreign Application Priority Data

Nov. 4, 1976 [CA] Canada .................................. 265082

[51] Int. Cl.² .......................... F01D 11/00; F01B 25/02
[52] U.S. Cl. .................................... 415/113; 415/160; 415/172 R; 415/163
[58] Field of Search ............... 415/151, 163, 172, 160, 415/113

[56] References Cited

U.S. PATENT DOCUMENTS

| 1,478,053 | 12/1923 | Overn | 415/161 |
|---|---|---|---|
| 2,291,110 | 7/1942 | Sharp | 415/163 |
| 2,423,825 | 7/1947 | Blom | 415/175 |
| 2,651,492 | 9/1953 | Feilden | 415/160 |
| 2,752,175 | 6/1956 | Fletcher | 415/113 |
| 3,059,902 | 10/1962 | Savonuzzi | 415/163 |
| 3,743,435 | 7/1973 | Stanley et al. | 415/163 |
| 3,947,147 | 3/1976 | Loktaeva | 415/163 |
| 3,954,348 | 3/1976 | Renaud | 415/113 |

FOREIGN PATENT DOCUMENTS

| 1128750 | 1/1957 | France | 415/172 |
| 1266309 | 5/1961 | France | 415/163 |
| 1292342 | 3/1962 | France | 415/163 |

Primary Examiner—William L. Freeh
Attorney, Agent, or Firm—Raymond A. Eckersley

[57] ABSTRACT

A hydraulic turbo-machine incorporating wicket gates for purposes of controlling and closing down the flow of working fluid through the machine is provided with an annular ring gate selectively operable to take up any operating clearance between the casing and the adjacent axial edge of the wicket gates. This arrangement makes it practical to incorporate relatively large initial clearances between the wicket gates and the fixed machine structure, so as to leave provision for natural contraction of such clearances during the life of the machine, due to shrinkage of the concrete or other expected or unexpected causes. The operation of the annular ring as a piston within a cylinder is facilitated utilizing penstock water or oil under pressure as the motivating fluid.

2 Claims, 3 Drawing Figures

HYDRAULIC TURBO MACHINE WICKET GATE SEALS

This invention is directed to a hydraulic turbo machine, and in particular to a machine of the type incorporating wicket gates to isolate the runner of the machine from the working liquid.

In the operation of hydraulic turbo machines such as pumps, turbines and pump turbines embodying wicket gates for the purpose of controlling and closing off the flow of working liquid problems arise in relation to gate clearances, during the course of erection, and subsequently during the lifetime of the machine.

In order to effect closing down of the machine it is necessary to be able to substantially completely close off all through-flow of working liquid, e.g. water. For this reason the end clearances between the wicket gates and the turbine housing need to be reduced to a minimum, compatible with satisfactory operation of the gates. The achievement of such a fit is generally expensive, as it normally requires hand grinding of the top and/or bottom edges of the gates. However, it is regarded as necessary in order to avoid the cavitation phenomena which would attend the provision of large clearances. The achievement of such a close fit between gate ends and housing surfaces from the disadvantage that over the lifetime of the machine considerable shrinkage or expansion in axial dimension of the machine casing can take place. Such casing changes can interfere markedly with the functioning of the wicket gates, to the extent of causing severe damage and malfunction to the gates, and even jamming.

The prior arrangement provided as an attempt to reduce the leakage past the wicket gates, shown in Canadian Pat. No. 403,589—Sharp, Mar. 24, 1942 comprises top and bottom annular spacer ring gates positioned coaxially with the machine runner, having a series of positioning capscrews theoretically accessible from without the machine and selectively adjustable to diminish the axial clearances between the machine housing and the top and bottom edges of the wicket gates. Whilst not being known in a practical sense, it appears that such an arrangement might be feasible, if adjusted during initial erection, and subsequently readjusted during machine shut-down.

In accordance with the present invention the axial clearance between the top of the wicket gates and the adjacent portion of the head cover is made unduly large, to the extent that full allowance is made for any feasible casing shrinkage that may occur during the life of the machine. An annular spacer ring piston is provided, to take up this clearance under selected conditions.

During normal operation the spacer ring piston is caused to retract within its cylinder, under the influence of pressure forces acting thereon arising from water flow conditions. Upon closing down of the machine, the hydraulic forces acting upon the spacer piston are selectively controlled to move the piston axially into position to take up the undesired clearance and substantially seal off the end gap of the wicket gates.

The present invention provides a turbo-hydraulic machine having a stationary casing, an annular array of wicket gates located within a gap in the housing, an axial end clearance space between the array of wicket gates and the housing sufficient to accommodate normally experienced relative closure of the housing gap, an annular cylinder concentric with the main axis of the machine aligned in substantial axial coincidence with the wicket gates, an annular piston sealingly mounted in the cylinder for axial displacement therealong, and pressure fluid means connected to the cylinder to extend the piston axially outwardly towards the wicket gates in substantial end-sealing relation therewith.

Certain embodiments of the invention are described, reference being made to the accompanying drawings, wherein.

Figure 1:
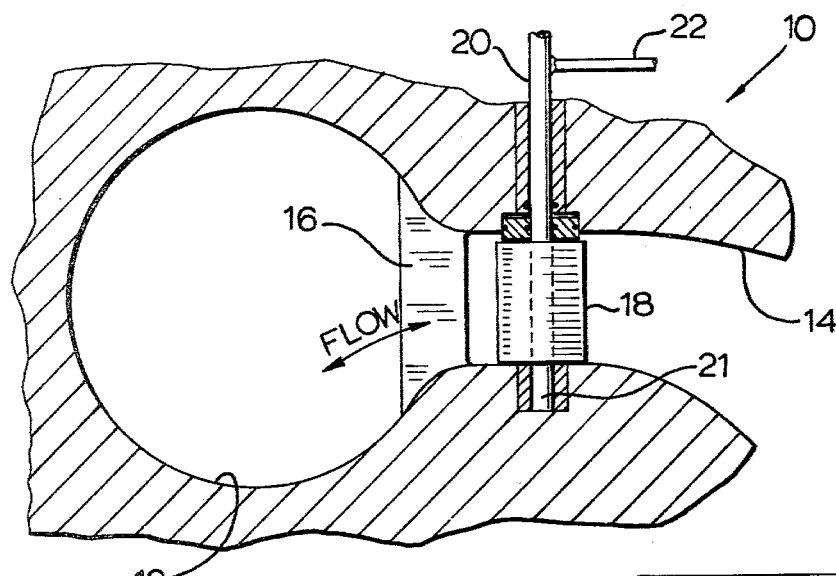
FIG. 1 is a schematic diametrical sectional elevation of a portion of a turbo-hydraulic machine embodying the invention.
Figure 2:
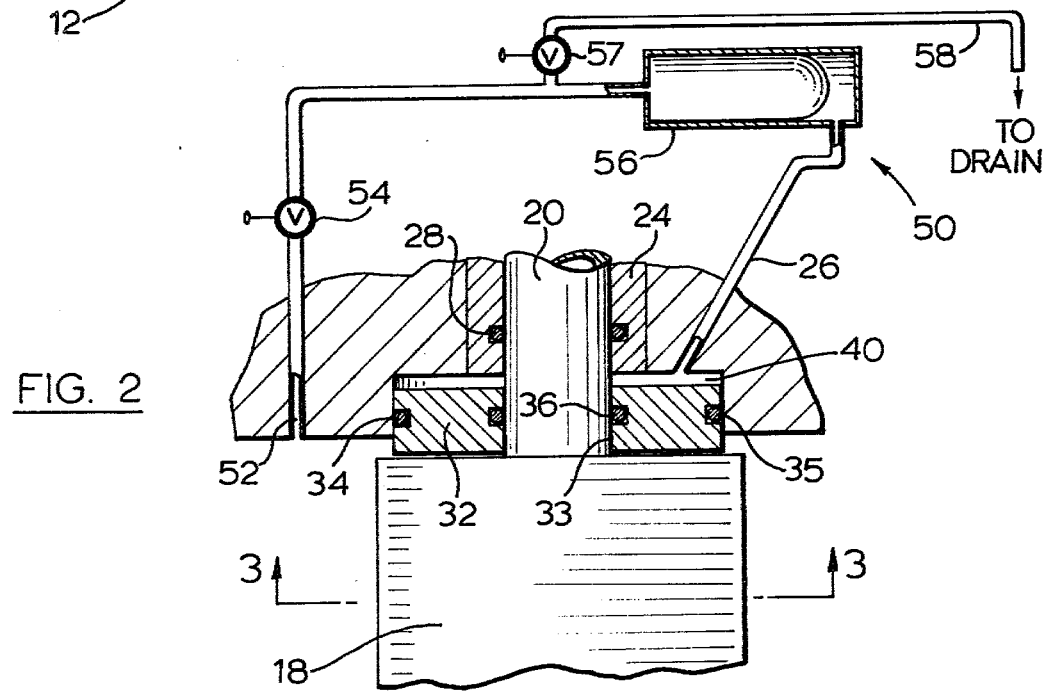
FIG. 2 is an enlarged view of the portion 2 of FIG. 1.

Referring to the drawings, the portion of machine 10 includes a section of inlet 12 of the usual annular form enclosing a runner, only a portion 14 of which is illustrated, guide vanes 16 define the outlet of the inlet 2. The double headed flow arrow is indicative of the possible function of the machine 10 as a pump or turbine, or pump turbine.

There is provided an annulus of wicket gates 18 each pivotally mounted by upper shaft 20 in top bearing 24 and lower trunnion 21 mounted in the lower casing, each gate being controlled by a moment arm 22 attached to a positioning servo mechanism (not shown). A sealing O-ring 28 seals the shaft 20 and bearing 24 against leakage.

The annular piston 32 according to the present invention has a plurality of apertures 33 therein through which extend the wicket gate spindles 20, being sealed by O-rings 36.

A pair of seals 34, 35 seal the annular sides of the piston 32 in sealing relation with the annular slot 40 in the machine headcover, to form a working space 30.

A water supply system 50 includes an inlet 52 from the supply or penstock 12, having an admission control valve 54 connecting with an accumulator 56 and a bypass valve 57 and line 58 leading to drain. The accumulator 56 has an oil outlet 26 connected to the working space 30 of the cylinder or slot 40.

Figure 3:
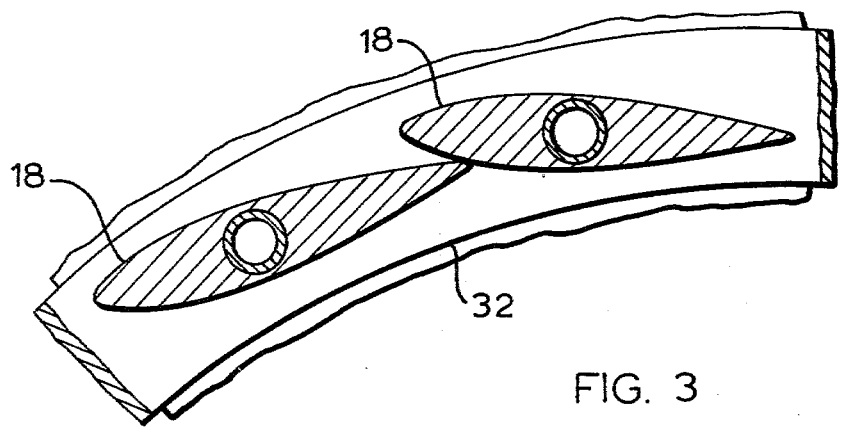
FIG. 3 is a view at 3—3 of FIG. 2.

In operation, during normal machine running, with the supply valve 54 closed and bypass valve 57 open, the pressure in working space 30 falls to atmospheric or thereabouts, and the pressure of working fluid (water) against the face of piston 32 is sufficient to push the piston 32 upwardly in its cylinder 40 to a fully retracted position. Upon closing of the wicket gates 18 to the closed position of FIG. 3, and upon closing of bypass valve 57 and opening of supply valve 54, the oil in working space 30 is pressurized sufficiently to push the piston 32 axially outwardly towards the adjacent ends of gates 18, into substantial sealing relation therewith.

In this condition the leakage of water past the closed wicket gates is substantially blocked, and the runner is effectively dewatered.

Before attempting to open the wicket gates 18, the supply valve 54 is closed and bypass valve 57 is opened, whereupon the water pressure against the lower face of piston 32, on the upstream side of the wicket gates, is sufficient to raise the piston 32 upwardly within its cylinder 40, and the gates 18 are then free to be opened without mechanical interference.

In the event that a wicket gate 18 should break loose from its servo linkage, due to shear pin failure, for instance, then the piston 32 may be closed downwardly against the wicket gates 18, and the flopping about of the free gate effectively and rapidly controlled, to limit consequential damage. In the case of a pump-turbine working in the pumping mode, the closure of piston 32 against the gates 18 effectively locks the gates 18, to minimize vibration.

What I claim as new and desire to secure by Letters Patent of the United States is:

1. In a turbo-hydraulic machine having a stationary housing, an annular array of wicket gates located within the housing, each gate having a shaft portion thereof pivotally mounted in the housing the improvement comprising a large axial end clearance space provided between the array of wicket gates and the housing comprising a shrinkage allowance sufficient to accommodate relative closure of the housing gap, an annular cylinder concentric with the main axis of the machine in substantial axial coincidence with the wicket gates, an annular piston mounted in the cylinder for substantially unrestricted axial displacement therealong, a hydraulic supply connecting an inlet portion of said stationary housing with said cylinder, having pressure responsive diaphragm means therein to preclude the passage of contamination therethrough, a pair of seal rings extending about the radially inner and the radially outer peripheries of the annular piston in sealing relation with the walls of the cylinder and pressure fluid means connected to the cylinder to extend the piston axially outwardly towards the wicket gates in substantial end sealing relation therewith, to take up said axial end shrinkage clearance between said gates and said housing.

2. The machine as claimed in claim 1, including drain means to permit selective connection of said cylinder to drain, whereby said piston is movable axially away from said wicket gates under the influence of working liquid under pressure within the housing, to permit unobstructed actuation of said wicket gates to an open position.

* * * * *